United States Patent
Natanzon et al.

(10) Patent No.: US 8,725,692 B1
(45) Date of Patent: May 13, 2014

(54) REPLICATION OF XCOPY COMMAND

(75) Inventors: Assaf Natanzon, Ramat-Gan (IL); Saar Cohen, Moshav-Mishmeret (IL); Ido Singer, New-Ziona (IL)

(73) Assignee: EMC Corporation, Hopkinton, MA (US)

( * ) Notice: Subject to any disclaimer, the term of this patent is extended or adjusted under 35 U.S.C. 154(b) by 532 days.

(21) Appl. No.: 12/969,944

(22) Filed: Dec. 16, 2010

(51) Int. Cl.
*G06F 7/00* (2006.01)
*G06F 17/00* (2006.01)

(52) U.S. Cl.
USPC .......................................... 707/640; 707/610

(58) Field of Classification Search
None
See application file for complete search history.

(56) References Cited

U.S. PATENT DOCUMENTS

| | | | | |
|---|---|---|---|---|
| 7,516,287 B2* | 4/2009 | Ahal et al. | | 711/162 |
| 7,577,867 B2* | 8/2009 | Lewin et al. | | 714/6.32 |
| 2005/0138306 A1* | 6/2005 | Panchbudhe et al. | | 711/162 |
| 2006/0112219 A1* | 5/2006 | Chawla et al. | | 711/114 |
| 2008/0086608 A1* | 4/2008 | Kano | | 711/162 |
| 2009/0300023 A1* | 12/2009 | Vaghani | | 707/10 |
| 2009/0300301 A1* | 12/2009 | Vaghani | | 711/162 |
| 2009/0300302 A1* | 12/2009 | Vaghani | | 711/162 |
| 2009/0327568 A1* | 12/2009 | Wayda et al. | | 710/306 |
| 2013/0006926 A1* | 1/2013 | Erofeev | | 707/610 |

* cited by examiner

*Primary Examiner* — Taelor Kim
(74) *Attorney, Agent, or Firm* — Krishnendu Gupta; Joseph D'Angelo

(57) ABSTRACT

A method, system and program product for implementing the xcopy command in a replication environment, the replication environment having a production site, a splitter, and a replication site, wherein the replication site has a journal, comprising, determining if the source and target LUNs of the xcopy command are replicated, based on a determination that both source and target LUNs are replicated, determining if the production and replication LUNs are synchronized, based on a positive determination that the LUNs are synchronized, and performing the xcopy command on the replication.

13 Claims, 11 Drawing Sheets

REPLICATION OF XCOPY COMMAND

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A method, system and program product for implementing the xcopy command in a replication environment, the replication environment having a production site, a splitter, and a replication site, wherein the replication site has a journal, comprising, determining if the source and target LUNs of the xcopy command are replicated, based on a determination that both source and target LUNs are replicated, determining if the production and replication LUNs are synchronized, based on a positive determination that the LUNs are synchronized, and performing the xcopy command on the replication.

DETAILED DESCRIPTION

Figure 1:
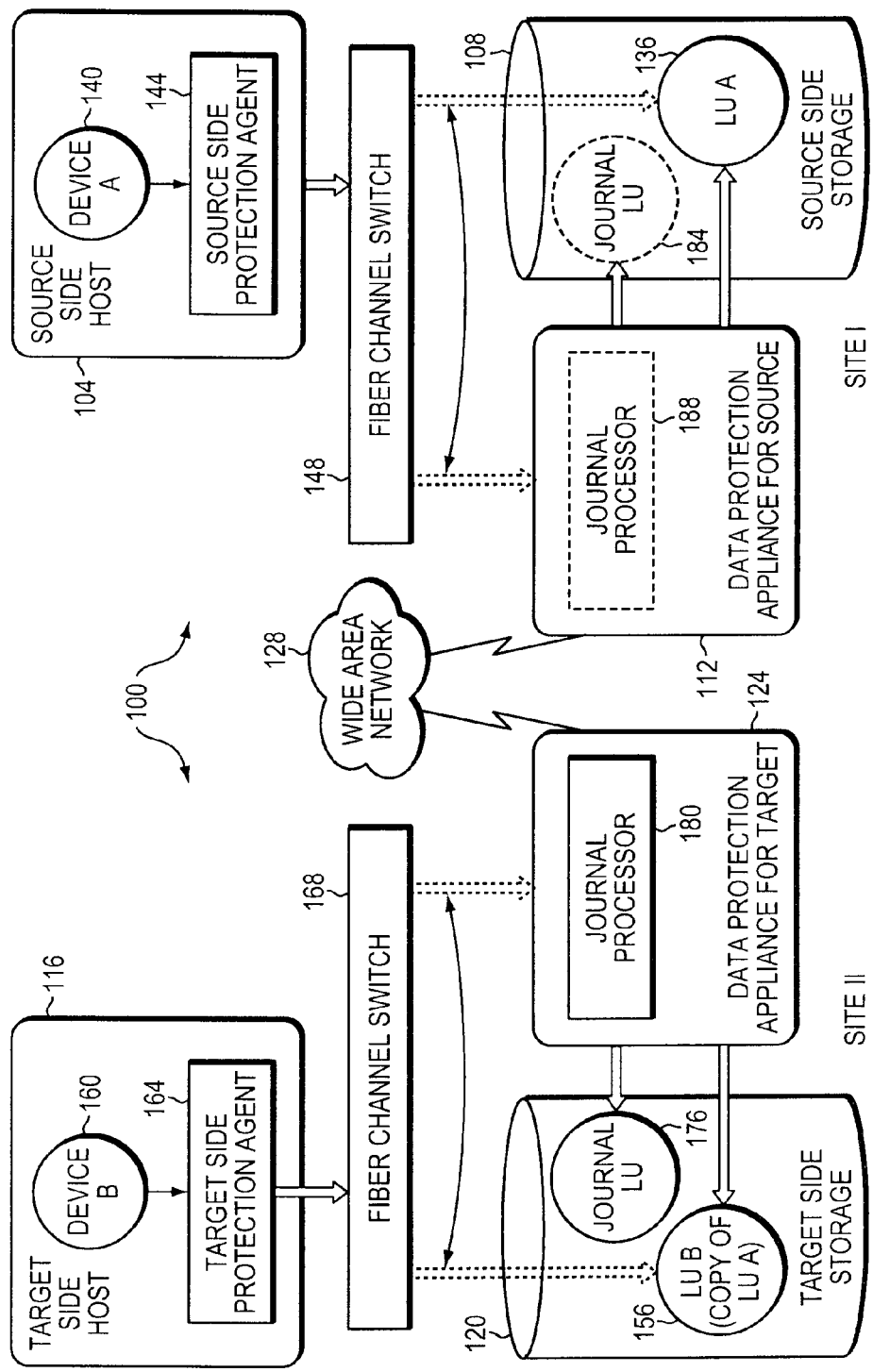
FIG. 1 is a simplified illustration of a data protection system, in accordance with an embodiment of the present invention.

Generally, storage arrays are starting to support new types of commands. One such command is the extended copy command (xcopy), which copies data from one volume to another and typically saves host resources and even storage resources. Conventionally, the xcopy command may not immediately copy all of the data from one volume to another and may perform some of the copy on demand.

Thus, replicating the xcopy command is a replication environment may be non-trivial. For example, the source volume may not be replicated, the remote volumes may not be completely in sync, or the remote storage may not support the xcopy command. In some embodiments of the current disclosure, the xcopy command may be replicated in a replication environment with journaling. In certain embodiments, if the source volume of the replication is not replicated the splitter will not allow the storage to complete xcopy command. In alternative embodiments, if the replication is initializing it may also block the command, for areas not completely synched. In further embodiments, such as in a steady state, the replication may replicate just the xcopy command, record the command in the journal, and apply the xcopy command at the replication site.

The following definitions are employed throughout the specification and claims.

BACKUP SITE—a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—a computer or a cluster of computers that serve as a data protection appliance, responsible for data protection services including inter alia data replication of a storage system, and journaling of I/O requests issued by a host computer to the storage system;

HOST—at least one computer or networks of computers that runs at least one data processing application that issues I/O requests to one or more storage systems; a host is an initiator with a SAN;

HOST DEVICE—an internal interface in a host, to a logical storage unit;

IMAGE—a copy of a logical storage unit at a specific point in time;

INITIATOR—a node in a SAN that issues I/O requests;

JOURNAL—a record of write transactions issued to a storage system; used to maintain a duplicate storage system, and to rollback the duplicate storage system to a previous point in time;

LOGICAL UNIT—a logical entity provided by a storage system for accessing data from the storage system;

LUN—a logical unit number for identifying a logical unit;

PHYSICAL STORAGE UNIT—a physical entity, such as a disk or an array of disks, for storing data in storage locations that can be accessed by address;

PRODUCTION SITE—a facility where one or more host computers run data processing applications that write data to a storage system and read data from the storage system;

SAN—a storage area network of nodes that send and receive I/O and other requests, each node in the network being an initiator or a target, or both an initiator and a target;

SOURCE SIDE—a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—a SAN entity that provides multiple logical units for access by multiple SAN initiators TARGET—a node in a SAN that replies to I/O requests;

TARGET SIDE—a receiver of data within a data replication workflow; during normal operation a back site is the target side, and during data recovery a production site is the target side;

WAN—a wide area network that connects local networks and enables them to communicate with one another, such as the Internet.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.
Redirect the SCSI command to another logical unit.
Split the SCSI command by sending it first to the respective DPA. After the DPA returns an acknowledgement, send the SCSI command to its intended logical unit.
Fail a SCSI command by returning an error return code.
Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 will host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
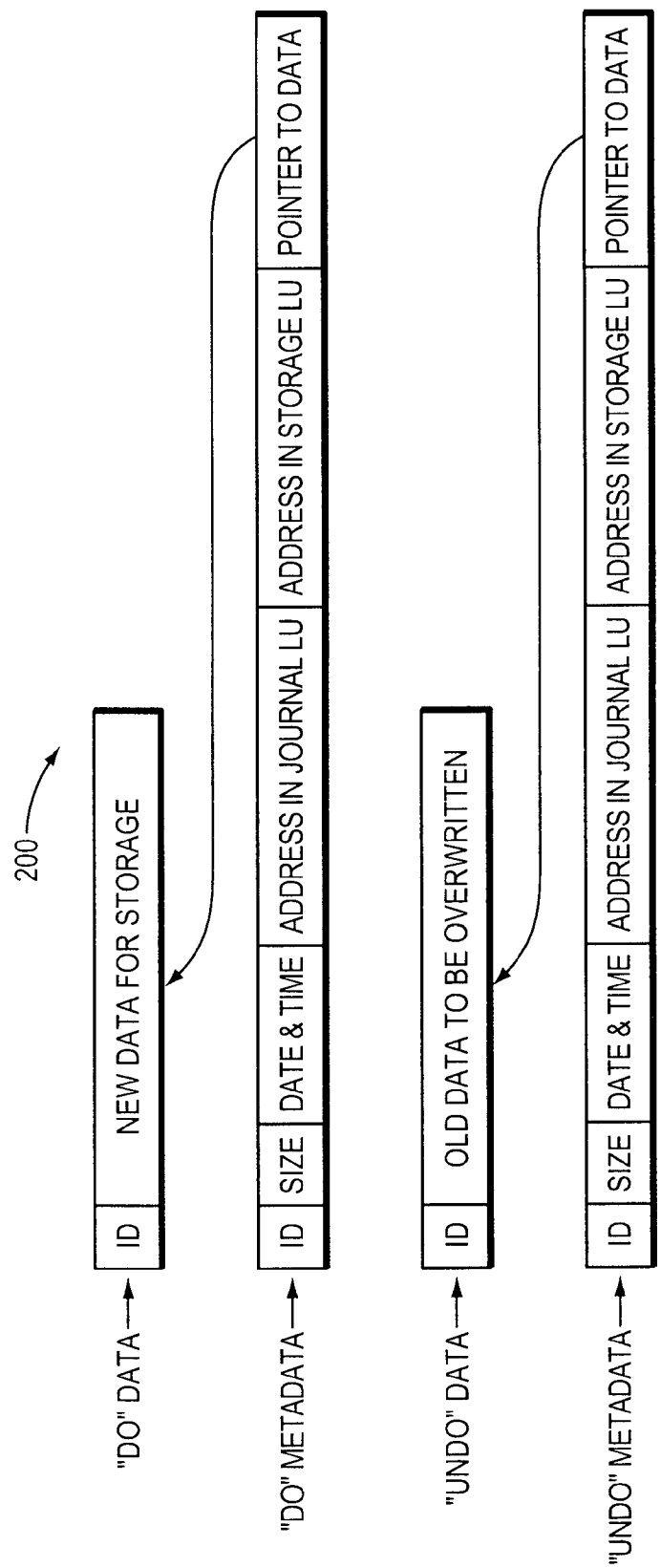
FIG. 2 is a simplified illustration of a write transaction for a journal, in accordance with an embodiment of the present invention.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
one or more identifiers;
a time stamp, which is the date & time at which the transaction was received by source side DPA 112;
a write size, which is the size of the data block;
a location in journal LU 176 where the data is entered;
a location in LU B where the data is to be written; and
the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a predefined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Delta Marking

A delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g. DO stream). Specifically, during an initialization process no data may be freed from the delta marking stream; and only when the initialization process is completed and I/O data has arrived to both local storage and the remote journal data, may be I/O data from the delta marking stream freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called ping pong process to synchronize the data. The process may transfer the differences between the production and replica site to the replica.

Replication of xcopy Command

Typically, the xcopy command enables a copy command to be issued and allows storage to decide the optimal time to copy the data. Usually, the command parameters are the source volume, offset and number of blocks, as well as target volume, offset and number of block, where source and target LUN may be identical. Generally, the storage may send the source LUN address and offset to the target. Usually, the target may take the offset and a set of bytes or number of blocks for the copy. Conventionally, the storage will manage when the copy will occur and if a request occurs for the data before it is copied, the data will be copied on demand or the request will be rerouted to where the data actually exists on the storage.

This may present challenges to replicating the xcopy command in a continuous replication environment. In some embodiments, the xcopy command may be executed between a first and a second LUN on a production site, however only the second LUN may be replicated on the replication site. Similarly in an alternative embodiment, an xcopy command may be executed on the production site copying from a first LUN to a second LUN, and only the first LUN may be replicated on the replication site. In a further embodiment, the replicated image may not be synchronized with the production images. In an embodiment, the present disclosure enables the xcopy command to be replicated. As used herein the terms volume, LUN, LUNs, target LUN, target LUNs, source LUN, and source LUNs may refer to one or more LUNs or volumes.

Both LUNS are Replicated and Synched

Figure 3:
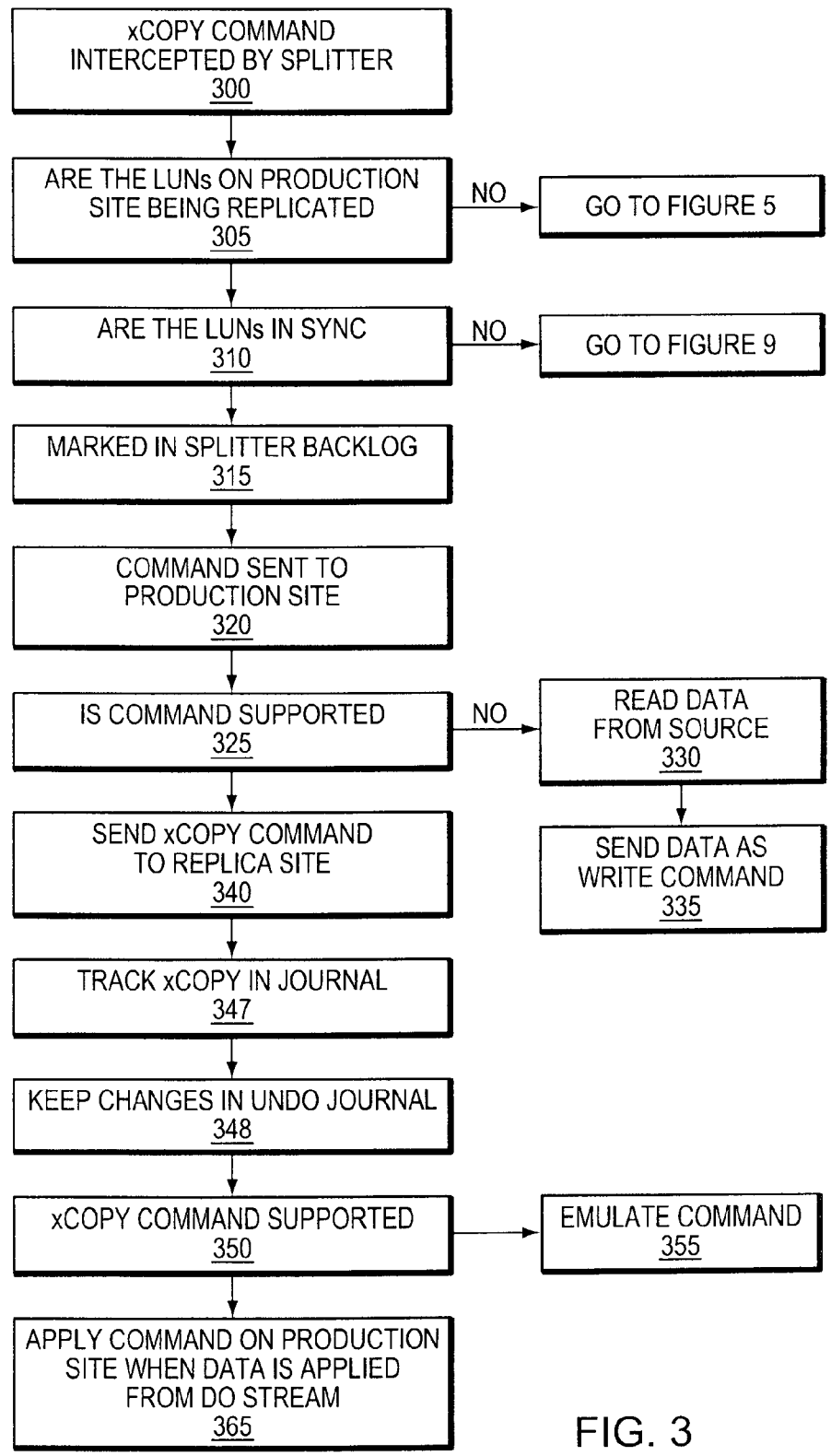
FIG. 3 is an illustration of a simplified method of implementing the xcopy command, in accordance with an embodiment of the present invention.
Figure 4:
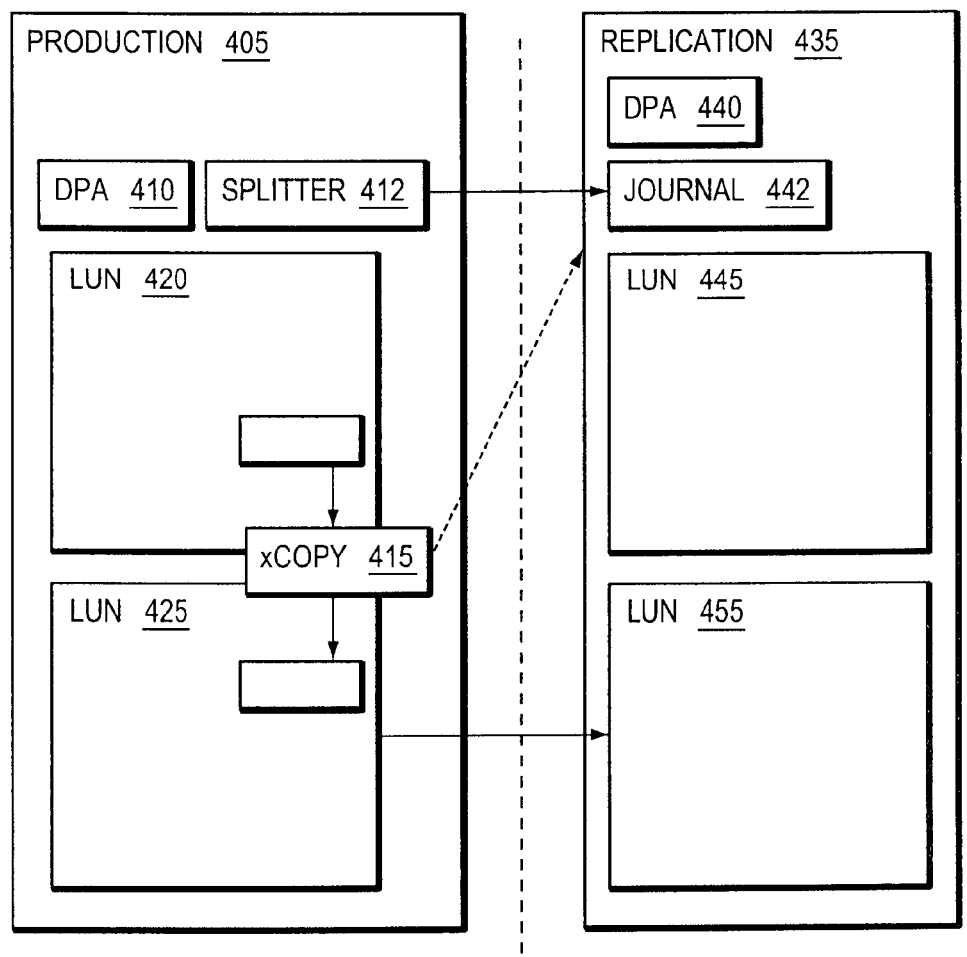
FIG. 4 is a simplified illustration of a data protection system and an xcopy command, in accordance with an embodiment of the present invention.

Refer now to the embodiments of FIGS. 3 and 4. The embodiment of FIG. 4 illustrates a simplified replication system with two LUNs 420, 425 on production site 405 and two LUNs 445, 455 on replication site 435. An xcopy command 415 is executed on production site 405. In these embodiments, the xcopy command 415 is intercepted by the splitter 412 (step 300). It is determined if both LUNs 420 and 425 are being replicated on the replication site 435 as LUNs 445 and 455 (step 305). It is determined that LUNs 420 and 425 are in sync with LUNs 445 and 455 on the replication site 435 (step 310). The target offsets of the xcopy command 415 are be marked in the splitter 412 backlog (step 315); thus if there is an error, the area changed may be marked as a dirty area. The command is sent to production DPA 410 (step 320), and the target location of the command is tracked in the delta marking stream. The production DPA 410 will determine if command 415 is supported (step 325) If command 415 is supported the DPA 410 may acknowledge the command 415 and the splitter 412 sends the xCopy command 415 down the IO stack (step 340). If the command is not supported, DPA may return a non supported status to the splitter, splitter 412 may read data from the source 405 (step 330) and send it to the DPA 410 as a new write command (step 335). In alternative embodiments, if the xCopy command 415 is not supported, the splitter 412 may notify the application that the command is temporarily not supported.

If the xCopy command is not rejected, the production DPA 410 sends the xCopy command 415 to the replica DPA site 435 (step 340). The xCopy command is written to the Do Stream and the Do Meta Data stream (step 347). When data is applied from the do stream to the volume 445 it is determined if the xCopy command 415 is supported on the replica 435 (step 350). If the xcopy command 415 is not supported, the replica 435 may emulate the command (step 355). The xcopy command 415 may be emulated on the replication site 435 by having the remote DPA 440 read from the first volume 445 and write to the second volume 455.

Otherwise the copy command may be applied on the replica volumes copying between volumes 445 and 455 (step 365). Before applying the xcopy command, the undo of the changes it is making may be kept in the undo journal on the replication site (step 348). Note, the steps of FIG. 3, as with the other methods, have been presented as a particular embodiment in a particular order. In other embodiments, the steps may be performed in parallel or in a different order within the spirit and teaching of the current disclosure.

Target LUN of xcopy is not Replicated

Figure 5:
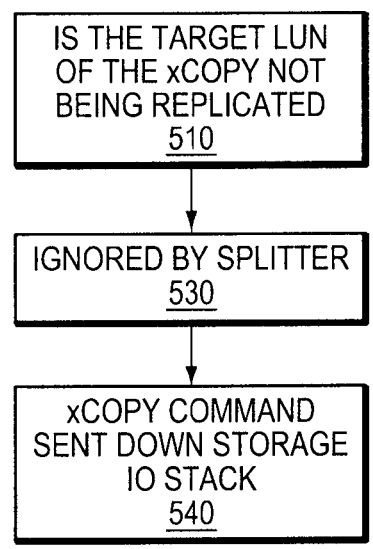
FIG. 5 is an illustration of a simplified method of implementing the xcopy command where either the target or source LUN is not being replicated, in accordance with an embodiment of the present invention.
Figure 6:
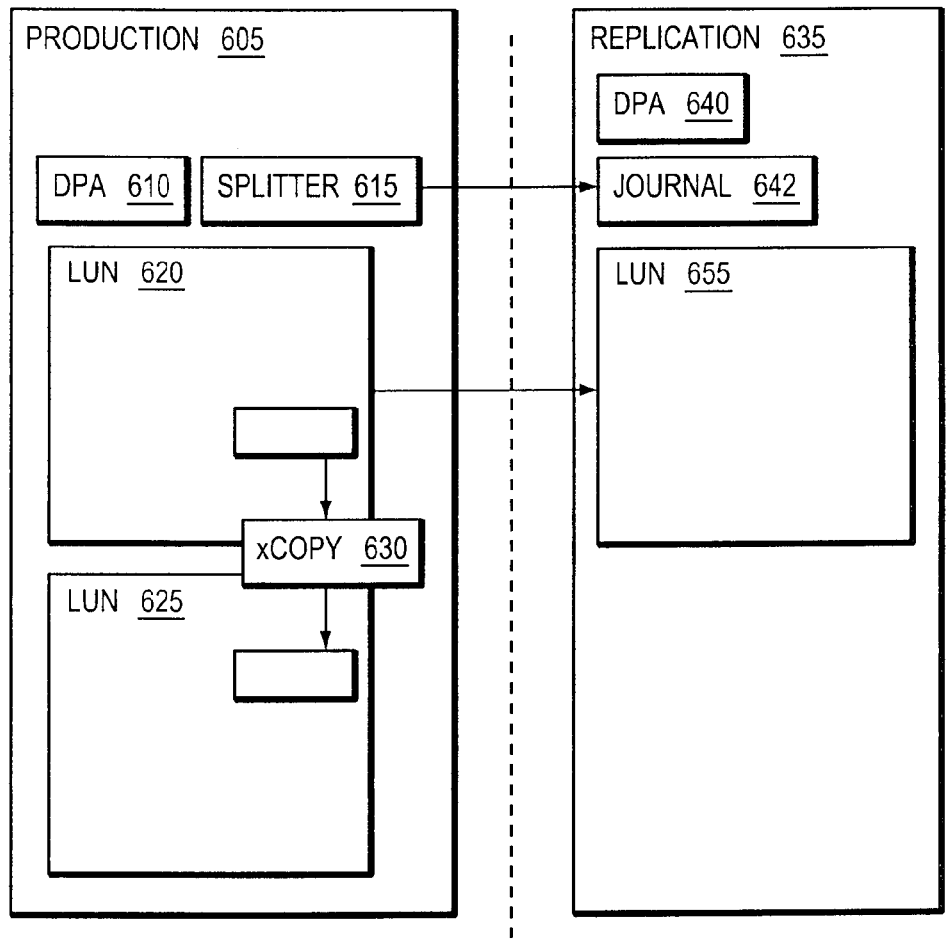
FIG. 6 is a simplified illustration of a data protection system in which the target LUN is not being replicated, in accordance with an embodiment of the present invention.

Refer now to the example embodiments of FIGS. 5 and 6. In the embodiments of FIGS. 5 and 6, there are two LUNs 620, 625 on production site 605 and one LUN 655 is being replicated on the replication site 635. It is determined if the target, LUN 625, of the xcopy command 630 is not being replicated (step 510). In this case since the xCopy command 630 does not change the replicated volume it is ignored by the splitter 615 (step 530). The xCopy command is sent down the storage 10 stack (540).

Source LUN of xcopy is not Replicated or Source LUN is in a Different Consistency Group than Replica LUN.

Figure 7:
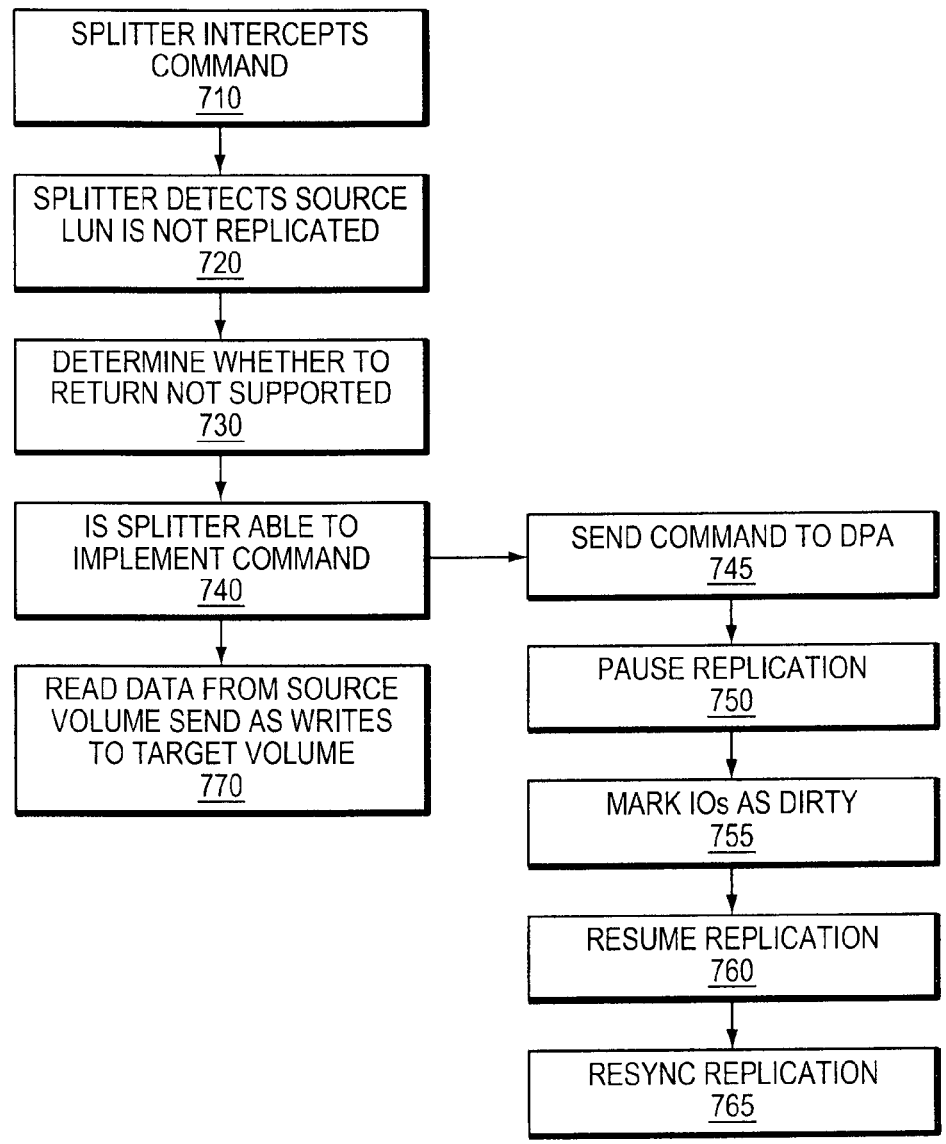
FIG. 7 is an illustration of a simplified method of implementing the xcopy command where the and source LUN is not being replicated, in accordance with an embodiment of the present invention.
Figure 8:
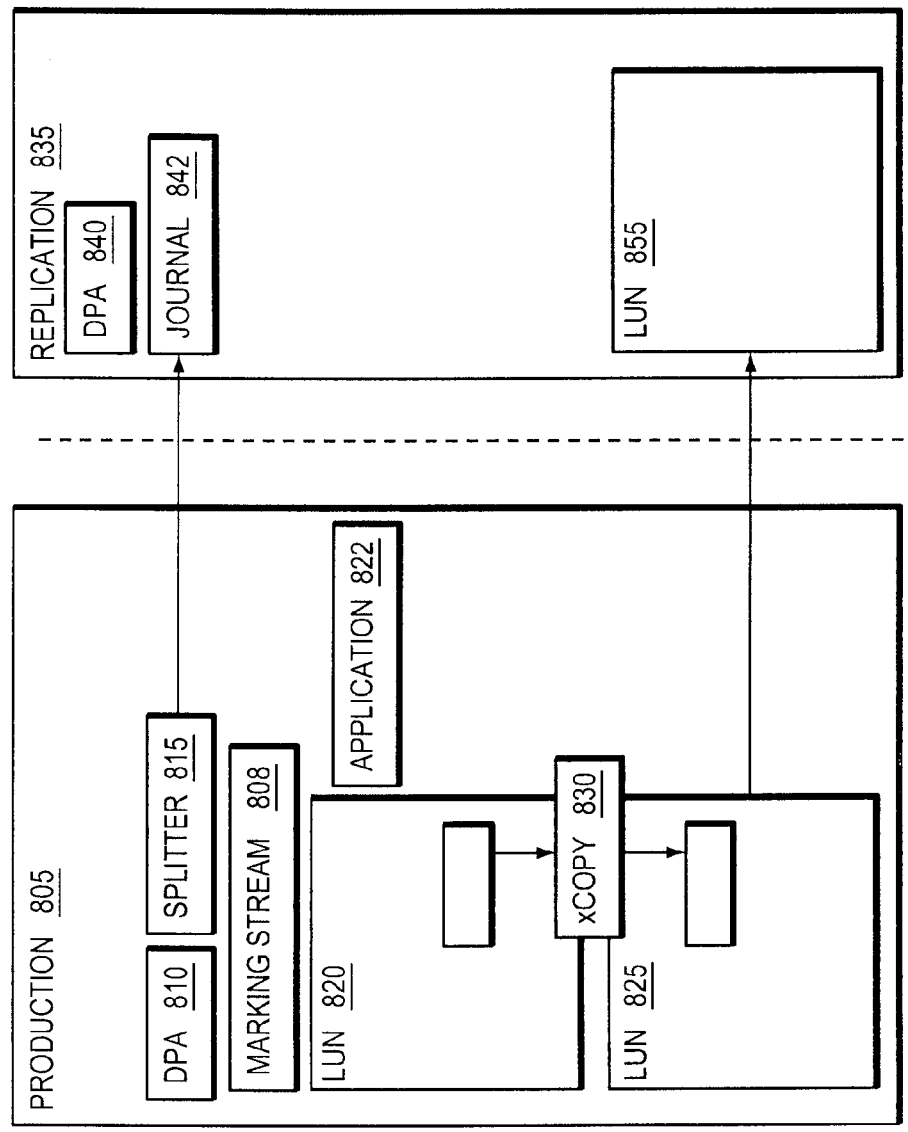
FIG. 8 is a simplified illustration of a data protection system in which the source LUN is not being replicated, in accordance with an embodiment of the present invention.

Refer now to the example embodiments of FIGS. 7 and 8. In the embodiments of FIGS. 7 and 8, production site 805 has two LUNS 820, 825. Replication site 835 is replicating LUN 825 as LUN 855 and is not currently configured to replicate LUN 820.

An xcopy command 830 is executed to copy data from LUN 820 to LUN 825. Splitter 815 on the production site 805 intercepts the xcopy command 830 (step 710). Splitter 815 may detect the source LUN is not replicated (step 720). This may be because the LUN 820 is not in the same consistency group as the target LUN 855. The splitter 805 determines, based on its configuration, whether to return a status that xCopy command 830 is not supported (step 730). The application 822 may stop using xCopy commands between this pair of volumes, 820, 825 based on the non-supported response.

If the splitter 830 is not configured to return a not supported command, the splitter 815 determines if is able to implement the xcopy command 830 (740). The splitter 815 may implement xCopy 830 by reading the data from the source volume 820 and sending it as writes to the target volume 855 (step 770). If the splitter 815 does not implement the command, splitter 815, on intercepting the command, sends it to the DPA 810 (step 745). DPA 810 pauses the replication and marks the IO area as dirty in the delta marker stream 808 (step 755). The replication resumes (step 760). The dirty areas are re-synchronized (step 765).

LUNs are Replicated but not Synched

Figure 9:
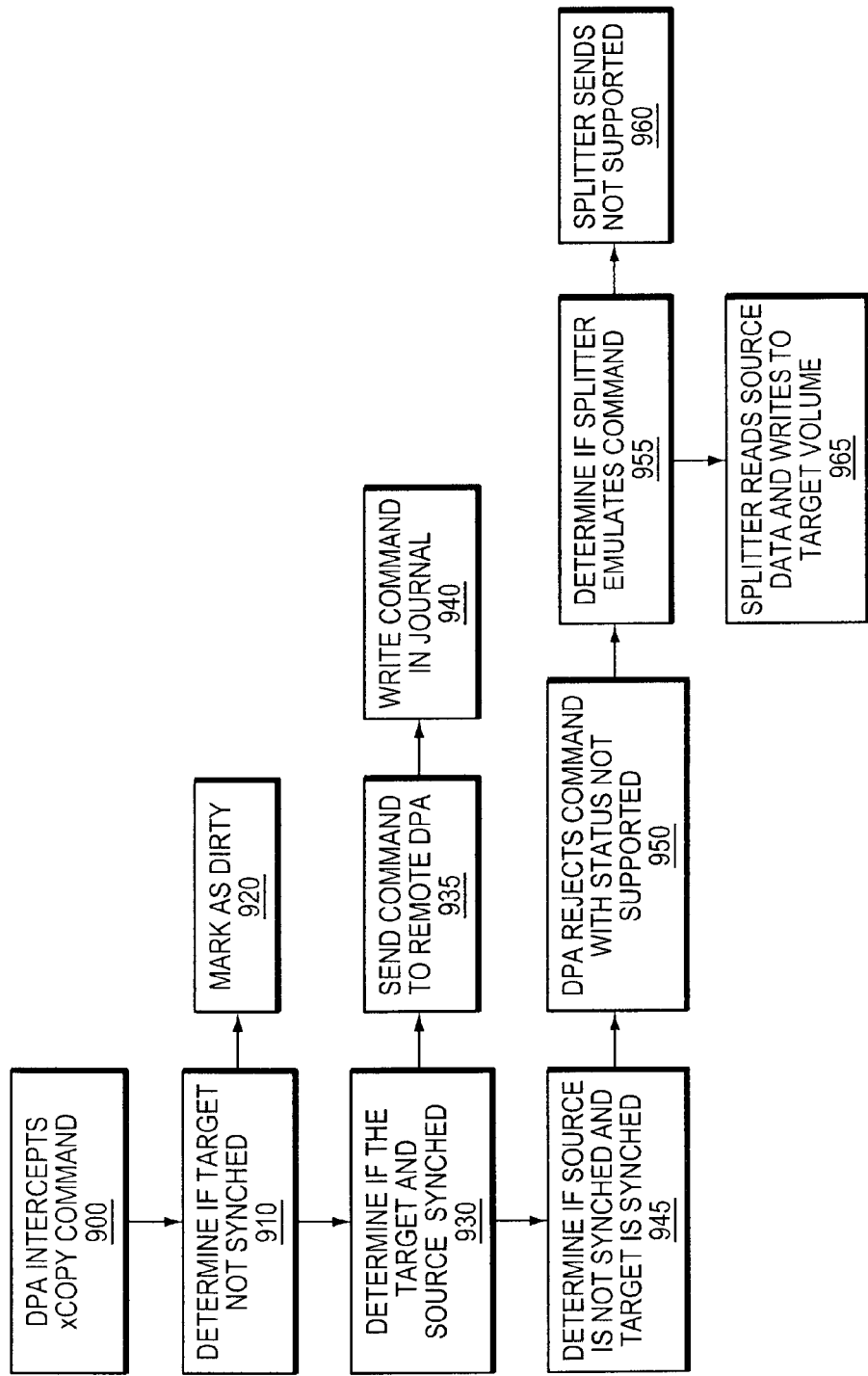
FIG. 9 is an illustration of a simplified method of implementing the xcopy command where the target and source LUN are being replicated but the LUNs are not in synch, in accordance with an embodiment of the present invention.
Figure 10:
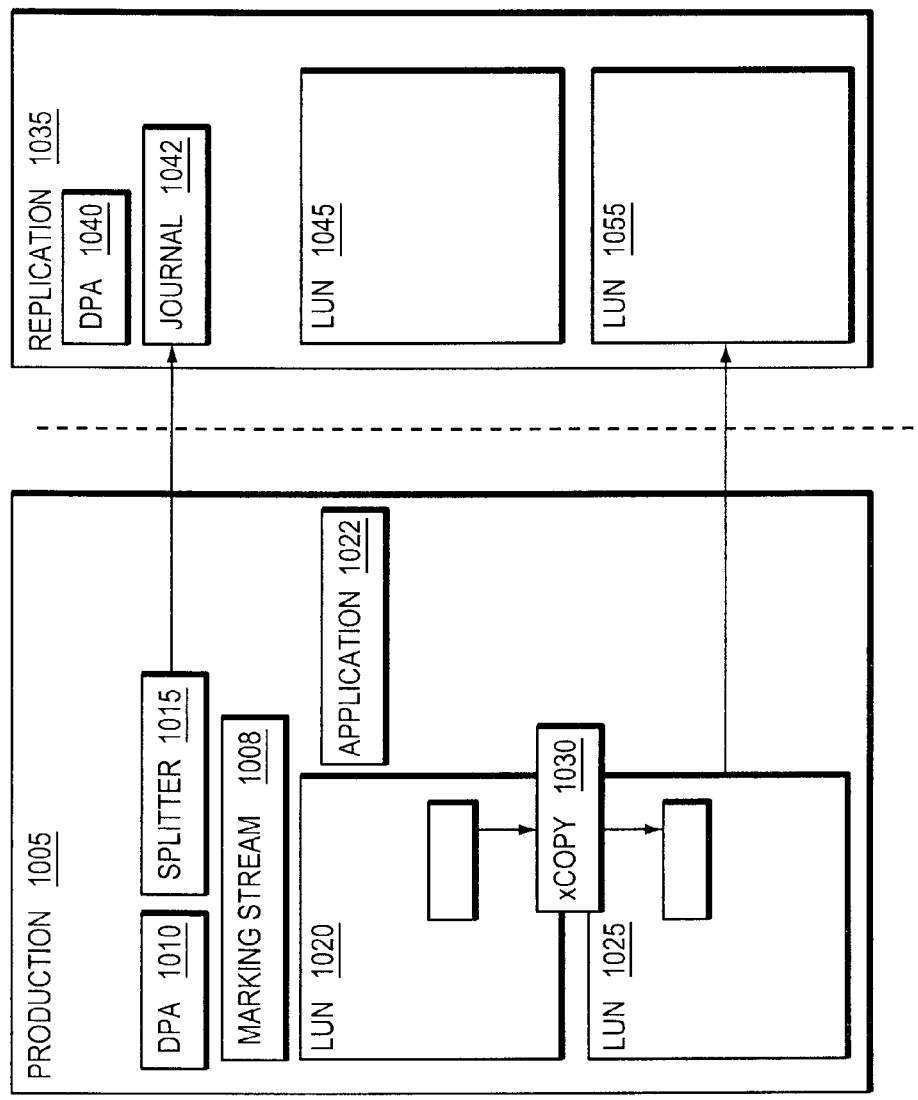
FIG. 10 is a simplified illustration of a data protection system in which the target and source LUNs are being replicated but the LUNs are not in synch, in accordance with an embodiment of the present invention.

Refer now to the embodiments of FIGS. 9 and 10. In these embodiments, if the LUNs 1020, 1025 are replicated but are not synched, and initialization process to synchronize them may be running, then additional steps may be taken. Splitter intercepts the xCopy command and tracks it in the Splitter backlog and sends the command to the source DPA 1010. The DPA 1010 receives the xCopy command 1030 (step 900). A determination may be made if the target 1025 of the copy command 1030 is to non-synched portions of the replication (step 910). If the target 1025 is not synched, the locations which are target 1025 to the xCopy command 1030 may be marked as dirty in the delta marking stream 1008 (step 920), and may be automatically synchronized when initialization reached synching these locations.

In other embodiments, if the LUNs 1045, 1055 are not fully synched with LUNs 1020 and 1025, a determination may be made if the xcopy command 840 is between a synchronized portion of the LUNs (Step 930). If the portions are synched, then it may be possible to apply the xcopy command 1030. The xCopy command 1030 may be sent from the splitter 1015 do the DPA 1010 (step 935), the target locations of the command may be tracked in the delta marking stream and the command will be send to the remote DPA 1040. The command may be written in the journal 1042 (step 940) and treated in a similar way as in FIG. 3, 4.

In another embodiment a determination may be made if the source portion, 1020, of the command 1030 is not yet synchronized, while the target 1025 of the command 1030 has already been synchronized (step 945). The DPA 1010 returns to the splitter 1015 a status that the command is temporarily not supported (step 950). The splitter 1015 determines whether to emulate the command 1030 (step 955). If the splitter 1015 emulates the command 1030, the splitter 1015 may read the source data and send the data do the DPA 1040 (step 965). If the splitter 1015 does not emulate the command 1030, the splitter 1015 may return a status to the application 1022 that xcopy command 1030 is temporarily not supported. In some embodiments, the application may copy the data.

Figure 11:
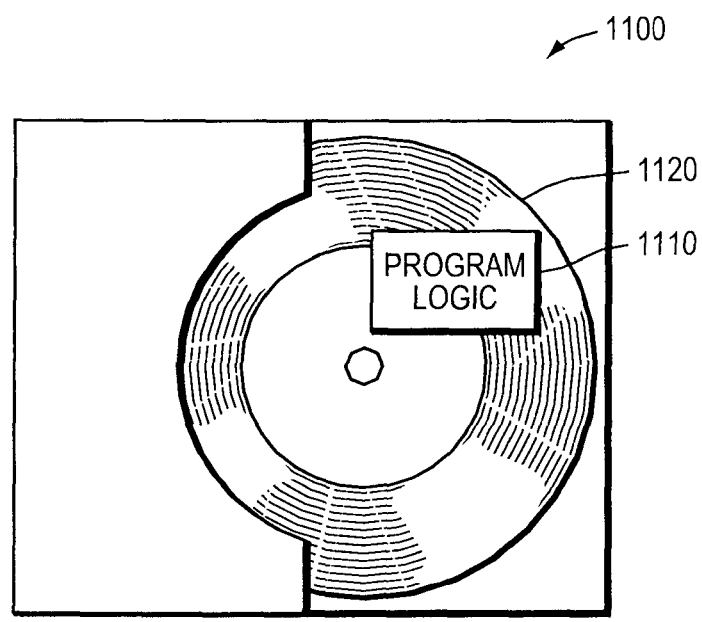
FIG. 11 is an embodiment of the current invention as embodied in program code.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 1, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 11 shows Program Logic 1110 embodied on a computer-readable medium 1130 as shown, and wherein the Logic is encoded in computer-executable code configured for carrying out the reservation service process of this invention and thereby forming a Computer Program Product 1100.

The logic for carrying out the method may be embodied as part of the aforementioned system, which is useful for carrying out a method described with reference to embodiments shown in, for example, FIG. 1 and FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. Thus it may be appreciated that, in addition to data replication systems, the optimal journaling policy of the present invention has widespread application to journaling systems including database systems and version control systems.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for implementing the xcopy command in a replication environment, the replication environment having a production site, a splitter, and a replication site, wherein the replication site has a journal, the method comprising wherein the replication environment replicates IO written to storage on the production site to storage on the replication site to provide a replicated copy of storage of the production site on the replication site through the use of a splitter to copy IO written to the production site for application on the replication site, wherein the production site and replication are enabled to not be synchronized:
   receiving an xcopy command at the splitter;
   determining if a source logical unit number (LUN) of the xcopy command on the production site is being replicated to a source LUN on the replication site;
   determining if a target LUNs of the xcopy command on the production site is being replicated to a target LUN on the replication site;
   based on a determination that both the source LUN on the production site and target LUN on the production site are replicated, determining if the source LUN on the production site is synchronized with the source LUN on the replication site;
   determining if the target LUN on the production site is synchronized with the target LUN on the replication site;
   determining, based on a positive determination that the LUNs are synchronized, if the xcopy command is supported;
   performing, based on a positive determination that the LUNs are replicated and synchronized and the xcopy command is supported, the xcopy command in the replication environment;
   based on a determination that the source LUN is not being replicated, determining whether the splitter is able to implement the xcopy command;
   based on a positive determination of the splitter being able to implement the xcopy command, reading the source LUN of the xcopy command from the source LUN and sending data from the source LUN as writes to the target LUN
   based on a determination that the splitter is unable to implement the xcopy command:
      emulating the xcopy command by the DPA;
      wherein the emulation comprises:
         sending the xcopy command to a data protection appliance (DPA);
         marking IOs of the xcopy command as dirty; and
      if the production and replication source and target LUNs are not in sync, determining whether to
         set a location as dirty in a marking stream, replicate the xcopy command, or reject the xcopy command.

2. The method of claim 1 further comprising: based on a determination that the target LUN is not being replicated and the source LUN is being replicated, ignoring the xcopy command in the splitter.

3. The method of claim 2 comprising sending the xcopy command down a storage Input/Output (I/O) stack.

4. The method of claim 1 further comprising: based on a determination that the source LUN is not being replicated, determining whether the splitter is able to implement the xcopy command.

5. A system for implementing the xcopy command in a replication environment, the system comprising: a production site, a splitter, a replication site, wherein the replication site has a journal, and computer-executable logic operating in memory, wherein the computer-executable program code is configured for execution of the following wherein the system replicates IO written to storage on the production site to storage on the replication site to provide a replicated copy of storage of the production site on the replication site through the use of a splitter to copy IO written to the production site for application on the replication site, wherein the production site and replication are enabled to not be synchronized:
   receiving an xcopy command at the splitter;
   determining if a source logical unit number (LUN) of the xcopy command on the production site is being replicated to a source LUN on the replication site;
   determining if a target LUNs of the xcopy command on the production site is being replicated to a target LUN on the replication site;
   based on a determination that both the source LUN on the production site and target LUN on the production site are replicated, determining if the source LUN on the production site is synchronized with the source LUN on the replication site;
   determining if the target LUN on the production site is synchronized with the target LUN on the replication site;
   determining, based on a positive determination that the LUNs are synchronized, if the xcopy command is supported;
   performing, based on a positive determination that the LUNs are replicated and synchronized and the xcopy command is supported, the xcopy command in the replication environment
   based on a determination that the source LUN is not being replicated, determining whether the splitter is able to implement the xcopy command;
   based on a positive determination of the splitter being able to implement the xcopy command, reading the source LUN of the xcopy command from the source LUN and sending data from the source LUN as writes to the target LUN based on a determination that the splitter is unable to implement the xcopy command:
  emulating the xcopy command by the DPA;
  wherein the emulation comprises:
    sending the xcopy command to a data protection appliance (DPA);
    marking IOs of the xcopy command as dirty; and
  if the production and replication source and target LUNs are not in sync, determining whether to
  set a location as dirty in a marking stream, replicate the xcopy command, or reject the xcopy command.

6. The method of system of claim 5 wherein the computer-executable logic further comprises:
  based on a determination that the target LUN is not being replicated and the source LUN is being replicated, ignoring the xcopy command in the splitter.

7. The method of system of claim 5 wherein the computer-executable logic further comprises: sending the xcopy command down a storage Input/Output (I/O) stack.

8. The method of system of claim 5 wherein the computer-executable logic further comprising: based on a determination that the source LUN is not being replicated, determining whether the splitter is able to implement the xcopy command.

9. A computer program product comprising: a non-transitory computer readable medium encoded with computer executable program code implementing the xcopy command in a replication environment, the replication environment having a production site, a splitter, and a replication site,
  wherein the replication site has a journal,
  the code enabling wherein the replication environment replicates Input and Output (I/O) written to storage on the production site to storage on the replication site to provide a replicated copy of storage of the production site on the replication site through the use of a splitter to copy IO written to the production site for application on the replication site, wherein the production site and replication are enabled to not be synchronized:
  receiving an xcopy command at the splitter;
  determining if a source logical unit number (LUN) of the xcopy command on the production site is being replicated to a source LUN on the replication site;
  determining if a target LUNs of the xcopy command on the production site is being replicated to a target LUN on the replication site;
  based on a determination that both the source LUN on the production site and target LUN on the production site are replicated, determining if the source LUN on the production site is synchronized with the source LUN on the replication site;
  determining if the target LUN on the production site is synchronized with the target LUN on the replication site;
  determining, based on a positive determination that the LUNs are synchronized, if the xcopy command is supported;
  performing, based on a positive determination that the LUNs are replicated and synchronized and the xcopy command is supported, the xcopy command in the replication environment;
  based on a determination that the source LUN is not being replicated, determining whether the splitter is able to implement the xcopy command;
  based on a positive determination of the splitter being able to implement the xcopy command, reading the source LUN of the xcopy command from the source LUN and sending data from the source LUN as writes to the target LUN
  based on a determination that the splitter is unable to implement the xcopy command:
    emulating the xcopy command by the DPA;
    wherein the emulation comprises:
      sending the xcopy command to a data protection appliance (DPA);
      marking IOs of the xcopy command as dirty; and
  if the production and replication source and target LUNs are not in sync, determining whether to
    set a location as dirty in a marking stream, replicate the xcopy command, or reject the xcopy command.

10. The computer program product of claim 9 wherein the code further enables: based on a determination that the target LUN is not being replicated and the source LUN is being replicated, ignoring the xcopy command in the splitter.

11. The computer program product of claim 9 wherein the code further enables: sending the copy command down a storage Input/Output (I/O) stack.

12. The computer program product of claim 9 wherein the code further enables: based on a determination that the source LUN is not being replicated, determining whether the splitter is able to implement the xcopy command.

13. The method of claim 1 further comprising
  keeping undo data;
  tracking the xcopy command in a remote journal;
  and applying the xcopy command to the remote volume if the xcopy command is supported or the xcopy command may be emulated.

* * * * *